Feb. 17, 1970  H. J. GERBER ET AL  3,495,492
APPARATUS FOR WORKING ON SHEET MATERIAL
Filed May 5, 1969  4 Sheets-Sheet 2

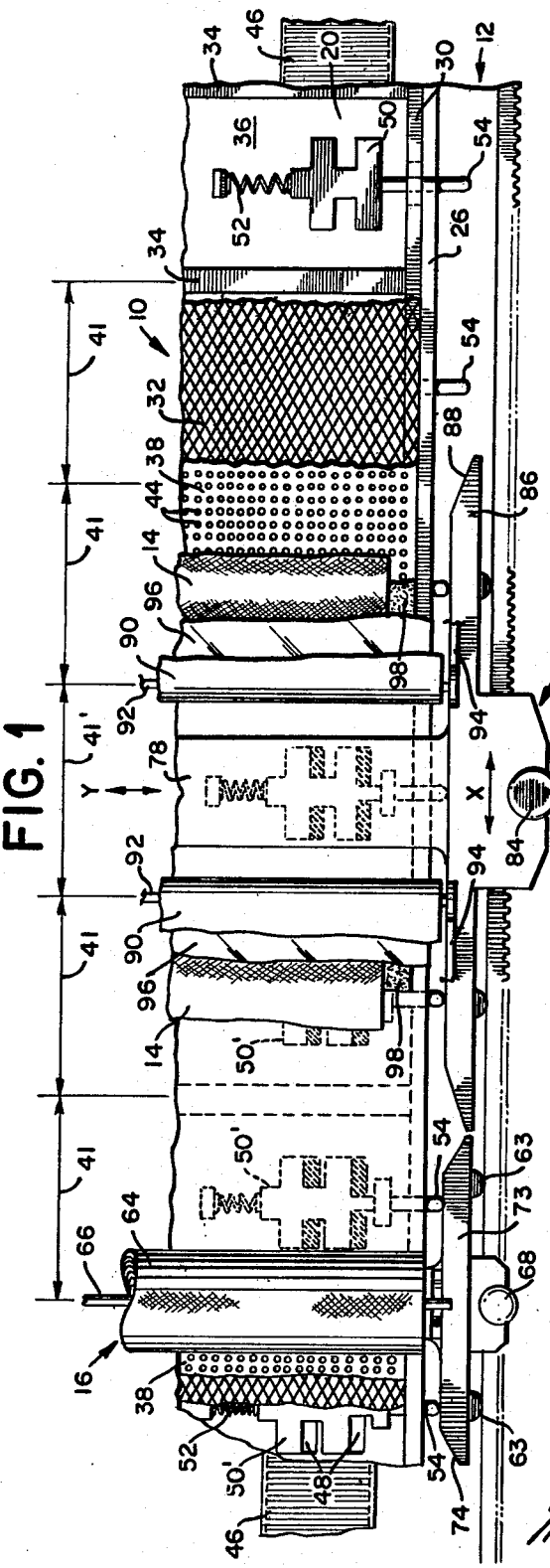

INVENTORS
HEINZ JOSEPH GERBER
DAVID R. PEARL
BY
McCormick, Paulding & Huber
ATTORNEYS Feb. 17, 1970   H. J. GERBER ET AL   3,495,492
APPARATUS FOR WORKING ON SHEET MATERIAL
Filed May 5, 1969   4 Sheets-Sheet 4

United States Patent Office 3,495,492
Patented Feb. 17, 1970

3,495,492
APPARATUS FOR WORKING ON SHEET MATERIAL
Heinz Joseph Gerber and David R. Pearl, West Hartford, Conn., assignors to Gerber Garment Technology, East Hartford, Conn., a corporation of Connecticut
Filed May 5, 1969, Ser. No. 821,780
Int. Cl. B26d 7/20
U.S. Cl. 83—374                                        24 Claims

ABSTRACT OF THE DISCLOSURE

Apparatus for working on fabric or other sheet material includes a vacuum hold-down device having a material supporting surface including a plurality of vacuum openings passing therethrough. A vacuum chamber associated with the supporting surface applies a vacuum through the vacuum openings to the sheet material spread thereon. The vacuum so applied to the material may be used to aid in spreading the material onto the supporting surface with a spreading tool and/or to hold the material in place during cutting thereof by an associated cutting tool. When the vacuum is used to hold the material in place for cutting, a sheet or panel of substantially air-impervious sheet material, such as a sheet of thin polyethylene is spread over the exposed surface of the material and cooperates with the vacuum to draw the material toward the supporting surface and into a more compact condition. The air-impervious panel used with the vacuum during cutting may be an expendable sheet of such material spread entirely over the material surface prior to cutting and/or may be one or two continuous belts of such material located in front of and/or behind the cutting tool. The vacuum and air-impervious panel may also be used to hold a layup of material to be cut in a compact condition for a long period of time between the laying up process and the cutting process to prevent the various layers of the layup from shifting, flowing or otherwise moving relative to one another so as to depart from their relative positions as initially laid up.

BACKGROUND OF THE INVENTION

This invention relates to apparatus for working on fabric and other sheet material and deals more particularly with improved apparatus for spreading and cutting sheet material.

The general aim of the present invention is to provide an improved apparatus of the aforedescribed type particularly adapted to operate automatically in response to signals from an associated control means such as a numerically controlled controller, computer or the like. A more specific aim of the present invention is to provide improved apparatus for rapidly and accurately spreading and cutting sheet material and particularly for spreading a layup of sheet material comprising layers of sheet material arranged in vertically stacked relationship and for cuting garment components or the like therefrom.

SUMMARY OF THE INVENTION

In accordance with the invention, apparatus is provided for working on fabric or other sheet materials which includes a vacuum holddown table, conveyor, drum or the like having a porous or perforated material supporting bed through which a vacuum is drawn by an associated vacuum chamber. Preferably the holddown device includes a longitudinal series of sheet material supporting zones and cooperates with a tool such as a spreader or cutter, supported to traverse the supporting surface, the device including means responsive to the movement of the tool for applying vacuum to successive regions of the supporting surface as the tool moves longitudinally thereof. In cases where the tool is a cutter or the like for working on the sheet material a sheet or panel of substantially air-impervious material is applied over the sheet material so that the vacuum draws such panel toward the supporting surface of the holddown device and compresses it therebetween to hold it in a more rigid compact state.

BRIEF DESCRIPTION OF THE DRAWINGS

FIG. 1 is a fragmentary plan view of apparatus embodying the present invention.
FIG. 2 is a fragmentary side elevational view of the apparatus of FIG. 1.

DETAILED DESCRIPTION OF PREFERRED EMBODIMENTS

Figure 3:
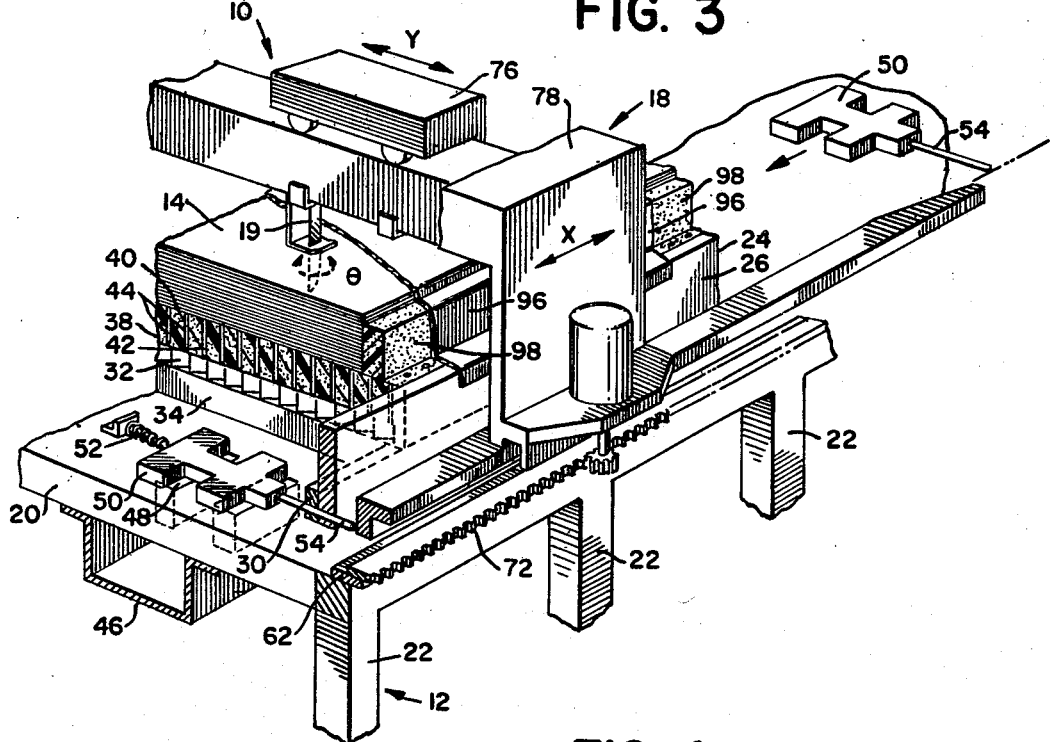
FIG. 3 is a fragmentary perspective view partially in section taken generally along the line 3—3 of FIG. 2.

Turning now to the drawings, and first considering FIGS. 1 to 4, an apparatus for working on fabric and other sheet materials and made in accordance with the invention is indicated generally at 10. The apparatus 10 is particularly adapted to spread or layup sheet material and to cut the material in response to input signals supplied to the apparatus by an associated control means such as, for example, a computerized or numerically controlled controller (not shown). More particularly, the apparatus 10 comprises an elongated vacuum holddown table indicated generally by the reference numeral 12 to provide support for a layup 14 which comprises layers of sheet material arranged in face-to-face or face-up vertically stacked relation. A spreading tool indicated generally at 16 and supported for movement longitudinally of the table in response to signals supplied by the controller serves to spread sheet material to form the layup 14. A cutting tool designated generally by the reference numeral 18 is supported to traverse the surface of the table 12 in two coordinate directions indicated by the arrows X and Y in response to position signals supplied by the controller. The cuting tool may take various forms but preferably, and as shown, it includes a blade 19 supported for vertically reciprocating movement in cutting engagement with the layup 14. The blade 19 is movable along any line which may be straight or curved as required in cutting a garment component or the like and is further arranged for rotation about its own axis in a direction indicated by the arrow $\theta$ and for vertical movement into and out of cutting engagement with the layup 14.

The apparatus 10 also includes means for applying vacuum to the hold-down table to position and smooth or remove wrinkles from the sheet material as it is spread and to hold it firmly in position on the table during the cutting operation. The latter means is responsive to longitudinal movement of either tool, as will be hereinafter further discussed.

Figure 4:
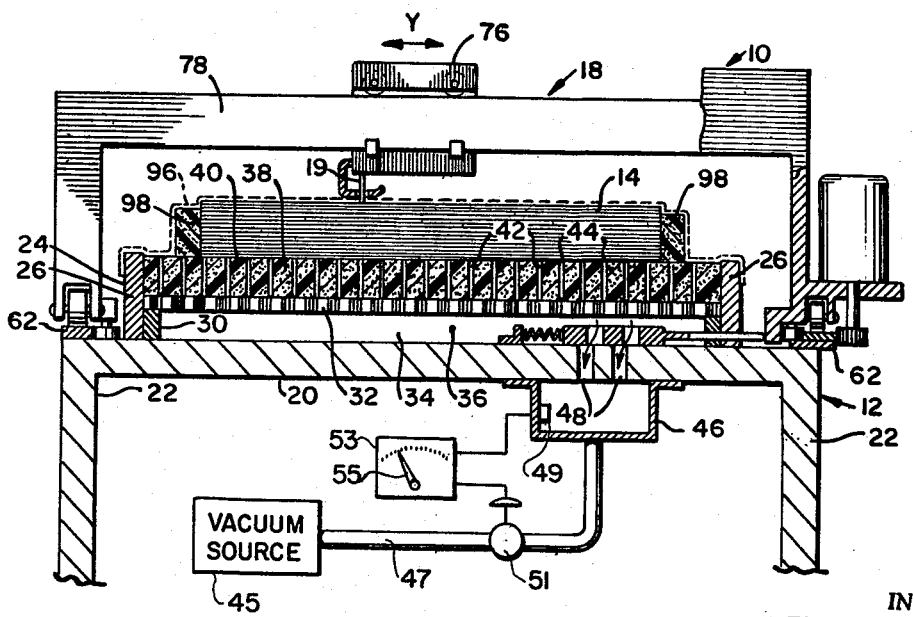
FIG. 4 is a sectional view taken generally along the line 4—4 of FIG. 2.

Considering the apparatus 10 in further detail, the table 12 comprises a generally horizontally disposed base plate 20 supported at convenient working height by a plurality of logs 22, 22. On the upper surface of the plate 20 there is mounted a generally rectangular frame 24 formed by longitudinally extending side members 26, 26 and transversely extending end members (not shown). A vertical spacing member 30 positioned inwardly adjacent each side member 26 extends longitudinally of the table between the end members to provide support for a perforated plate 32. Preferably, the plate 32 is made from expanded metal and spaced above the plate 20 and below the upper or free edge of the frame 24. A longitudinally spaced series of partitions 34, 34 extend transversely of the frame 24 between the spacers 30, 30 and the plates 20 and 32 to define a longitudinal series of chambers 36, 36 between the latter plates as best shown in FIG. 4.

A bed of material 38 is supported in the frame 24 by the plate 32 and has an upwardly facing fabric supporting surface 40 which includes a longitudinal series of fabric supporting zones 41, 41. Each zone 41 is associated with and located above a chamber 36. Various materials may be used to form the bed 38, but preferably it comprises a resilient low density cellular polyethylene plastic material which may be readily penetrated by the blade 19. The blade 19 is preferably adjusted to penetrate the table to assure accurate and efficient cutting of the lower layers comprising the layup. Ethafoam, a product of Dow Chemical Company, has proven particularly suitable as a bed material. The bed material includes a plurality of passageways passing therethrough for conducting vacuum from the chambers 36, 36 to the upper surface of the bed material which supports the material to be cut. If the bed material is porous, as for example a foamed plastic with an open cell structure, the porosity of the material may be used to provide these passageways. Preferably, however, the bed material is one which is substantially non-porous, as for example, a foamed plastic with a closed cell structure, and the vacuum transmitting passageways consist of vertically extending passageways 42, 52, as shown, drilled or otherwise formed in the bed and passing therethrough generally perpendicular to the supporting surface. As shown, each passageway at its upper end or in the plane of the supporting surface 40 terminates in an opening 44.

Vacuum is applied to the table 12 by a vacuum chamber or duct 46 which extends longitudinally of the table below the plate 20 and is connected to a suitable vacuum source 45 through a conduit 47, the vacuum source preferably being one of high flow rate capacity. A longitudinally spaced series of slots or ports 48, 48 formed in the plate 20 communicate with the duct 46 and with each of the chambers 36, 36. In the illustrated embodiment, two ports 48, 48 communicate with each chamber 36.

Application of vacuum to the table 12 is controlled by a plurality of slide valves 50, 50 mounted on the upper surface of the plate 20. Each valve 50 is associated with a pair of ports 48, 48 and is arranged for transverse sliding movement on the plate 20 between open and closed positions indicated respectively at 50 and 50' in FIG. 1. Each valve is biased toward its closed position by a spring 52 and movable to its open position in response to force applied to the free end of an associated control rod or follower 54 which projects from the body of the valve, passes through an associated spacer 30 and side member 26, and projects outwardly beyond the side member.

The spreader 16 is of a generally conventional type for face-to-face or face-up spreading of rolled fabric or other sheet material and comprises a supporting carriage 58 arranged to travel on rollers 60, 60 which engage ways 62, 62 fastened to and extending longitudinally of the table 12. Additional rollers 63, 63 mounted on the carriage 58 engage the inner sides of the ways 62, 62 to maintain the carriage in longitudinal alignment with the table 12. A roll or bolt of material designated at 64 is supported by a rod 66 which extends transversely of the carriage 58. A drive motor 68 mounted on the carriage and responsive to input signals from the controller carries a pinion 70 which engages a longitudinally extending rack 72 mounted on the table 12 to drive the carriage in the X direction. The carriage also has an elongated cam element 73 which includes a cam surface 74 adapted to engage and move each successive follower 54 as the carriage 58 moves longitudinally of the table. The cam surface 74 is of somewhat greater longitudinal extent than the longitudinal distance between three successive followers 54, 54. Thus, as the carriage 58 moves longitudinally of the table 12 the followers 54, 54 are successively engaged and each valve 50 is moved to and held in its open position until the cam surface 74 engages and opens the next successive valve 50.

The blade 19 is driven in cutting engagement with the layup 14 by a drive unit 76 supported for movement transversely of the table 12 by a movable supporting carriage 78 which bridges the table. The drive unit 76 is arranged to raise and lower the blade 19 relative to the table surface 40 and to move in its Y and θ directions in response to input signals from the controller as the carriage simultaneously moves the drive unit and blade in the X direction. Each end of the carriage is supported by a pair of rollers 80, 80 which travel on an associated way 62. A drive motor 84 secured to the carriage 78 and responsive to input signals from the computer carries a pinion 86 which engages the rack 72 to drive the carriage in the X direction. The carriage 78 also includes an elongated cam element 86 secured to one side thereof which has a cam surface 88 for engaging the followers 54, 54 to move the valves 50, 50 to their open positions. The longitudinal dimension of the cam surface 88 is at least equal to the longitudinal distance between four successive cam followers 54, 54. Thus, when the valve 50 associated with the cutting zone in which the blade 19 is operating is in its open position the valves associated with the zones adjacent the cutting zone will also be open. In FIG. 1 the cutting zone is designated at 41'.

Preferably, the cutting tool carries at least one panel adapted to overlie an associated portion of the upper surface of the layup 14 as the cutting tool moves longitudinally of the table 12. The illustrated apparatus 10 includes two longitudinally spaced apart panels or endless belts 90, 90 positioned at opposite sides of the blade 19. Each belt 90 is made from non-permeable plastic and supported by a pair of longitudinally spaced rollers 92, 92 journaled for rotation about transversely extending axes by arms 94, 94 which project longitudinally and in opposite directions from opposite sides of the carriage. The belts 90, 90 are preferably arranged for vertical adjustment relative to the carriage to accommodate layups or stacks of material of various height, so that the belts will rest on the upper surface of the material as the cutting tool 18 travels longitudinally relative to the table 12.

Considering now the operation of the apparatus 10, the spreading tool 16 and the cutting tool 18 are independently operative and when one of the tools is in operation the other is or may be positioned in an inactive area at one or the other end of the table 12, or, if desired, a transfer device (not shown) may be provided to move the tool not in use to a suitable storage position away from the table.

The spreading tool 16 moves in the X direction in response to input signals from the controller as sheet material is paid out from the bolt 64 in conventional manner. As the spreading tool advances each valve 50 in its path of travel is successively opened by the cam element 73 so that vacuum is applied to a table zone 41 in which the material is being spread. Each valve 50 remains in its open position until the cam element 73 engages and opens the next successive valve. Thus, the vacuum hold-down table 12 exerts a substantially continuous smoothing effect upon sheet material as it is spread longitudinally of the table surface. When the material is of a porous type, such as a woven fabric, vacuum acts upon an associated region of the lower surface of the fabric as it is brought into contact with the table surface 40 and also acts through the lower layers of fabric to exert smoothing effect upon an associated region of the lower surface of each successive upper layer comprising the layup.

When a layup of porous material is to be cut a substantially imperforate or air-impervious expendable panel 96 which may be readily cut by the blade 19 is preferably first positioned in overlying relationship with the layup as shown in FIGS. 3 and 4. The panel is imperforate in the sense that it is substantially impervious to the passage of air therethrough. Relatively thin flexible plastic film, such as polyethylene sheet, has proven particularly satisfactory for this purpose. When desirable to support fabric layups with thin or weak edges, longitudinally extending guide blocks 98, 98 are positioned adjacent the side edges of the layup before the panel 96 is positioned thereon. These blocks are preferably made of the same material as the bed 38, and in any event are made of a material which may readily be cut into by the cutting tool without damage to the tool. These guide blocks are not, however, necessary in all cases and when not used the panel 96 is spread so as to merely drape over the edges of the fabric layup. In either event the panel is preferably of such a size and so spread as to extend transversely across the full width of the layup, down both sides thereof and across a portion of the supporting surface 40 of the bed adjacent the sides of the layup, thereby completely enveloping the layup.

At the start of the cutting process, the blade 19 is elevated or raised to a position above and moved to a preselected starting position relative to the upper surface of the layup. Thereafter, the blade is lowered to penetrate the layup and the cutting cycle proceeds in accordance with its programmed pattern. As the carriage 78 moves in the X direction, it will be noted that the valve 50 associated with the cutting zone 41' is in its open position so that vacuum is applied to the surface 40 in the latter zone. It will be further noted that the valves 50, 50 associated with zones 41, 41 immediately adjacent the cutting zone 41' will also be in their respective open positions so that vacuum is also applied in latter zones. Vacuum is applied to both the lower surface of the porous material to be cut and through the latter material to the lower surface of the panel 76.

Vacuum is therefore applied to the lower surface of the material to be cut and when such material is porous the vacuum passes through and around such material to the lower surface of the air-impervious panel 76 and causes such panel to be attracted toward the supporting surface to compress or compact the layup. When the material of the layup is non-porous, the vacuum nevertheless passes around such material and applies a vacuum to the lower surface of the panel 76 to produce the same compressing or compacting effect.

The application of vacuum in the above described manner to compress or compact the layup causes the layup to assume a relatively rigid or firm condition with the individual layers of the layup being held tightly relative to one another so as not to shift or move during the cutting process. The compressing or compacting of the layup also has the additional advantage of "normalizing" the layup. That is, fabrics or other materials of different consistencies, particularly those with loose consistencies such as loose weaves, quilted fabrics and knitted goods, are compressed, according to their fluffiness or weight, to a somewhat normal or standard consistency so as to react in a generally uniform manner to the cutting action of the blade, that is, the compacting effect tends to make all materials substantially uniform as far as their reaction to the blade is concerned so that substantially the same cutting tool, feed rate, etc. may be used for many different materials. The amount of fabric compression attained from the application of a given vacuum will, of course, vary. In some instances, the free stack height of a given layup of fabric may be reduced significantly, as for example from 10 to 50%, so that a relatively short cantilevered blade may be used.

It should also be noted that another benefit achieved by the above described apparatus is that as vacuum is applied to the lower surface of the layup cooling air is drawn downwardly through the slit in the fabric around and behind the blade thereby cooling the blade as it advances in its programmed pattern.

Figure 5:
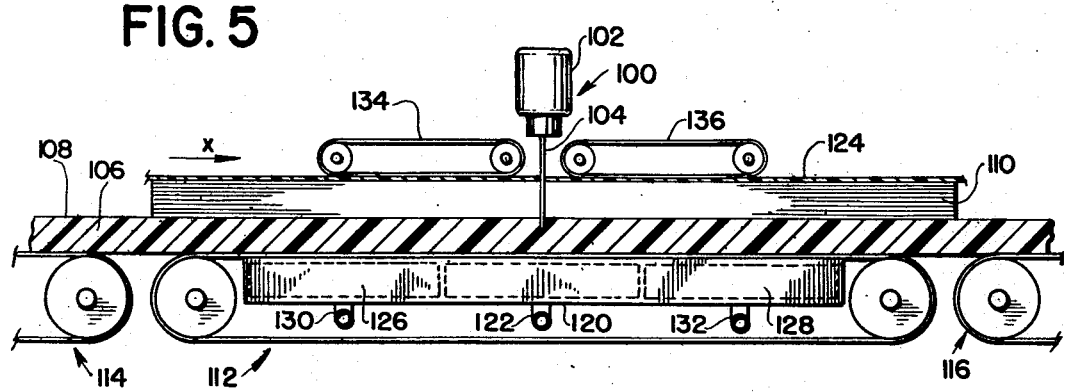
FIG. 5 is a schematic side view of apparatus comprising another embodiment of this invention.

FIG. 5 shows a cutting apparatus, indicated generally at 100, which utilizes a vacuum to hold the fabric or other sheet material while it is being cut but wherein the movement of the cutter relative to the sheet material in one of its two coordinate directions of relative movement is obtained by holding the cutter stationary in such coordinate direction and by instead moving the sheet material bodily in such coordinate direction. The cutter 102 includes a reciprocating blade 104 and operates in conjunction with a bed of penetrable material 106 having a supporting surface 108 on which is received the fabric layer 110. In the cutting zone the bed of penetrable material 106 and the fabric layup 110 is supported by an endless belt conveyor 112 located between two other belt conveyors 114 and 116. The belt of the conveyor 112 is porous and immediately below the cutter 102 and vacuum is applied to the fabric layup 110, through the belt of the conveyor 112 and through the bed of penetrable material 106, by an open topped vacuum chamber 120 connected to a source of vacuum through the conduit 122. Cooperating with the vacuum chamber 120 is a sheet of air impermeable material 124 which overlies the fabric layup 110 and which is pulled toward the supporting surface 108 by the vacuum to compress and hold the fabric layup in a suitable condition for cutting by the cutter. If desired, and as illustrated, additional vacuum chambers 126 and 128 may be located on opposite sides of the vacuum chamber 120 to apply a vacuum to a larger area of the fabric layup 110, these latter vacuum chambers being connected to the source of vacuum by the conduits 130 and 132, respectively. Either in addition to or in place of the air impermeable sheet 124 the apparatus 100 of FIG. 5 may include two endless belts 134 and 136 of air impermeable material, similar to the endless belts 90, 90 of FIG. 1, for cooperation with the vacuum applied to the layup to hold the layup in a condition for cutting.

Figure 6:
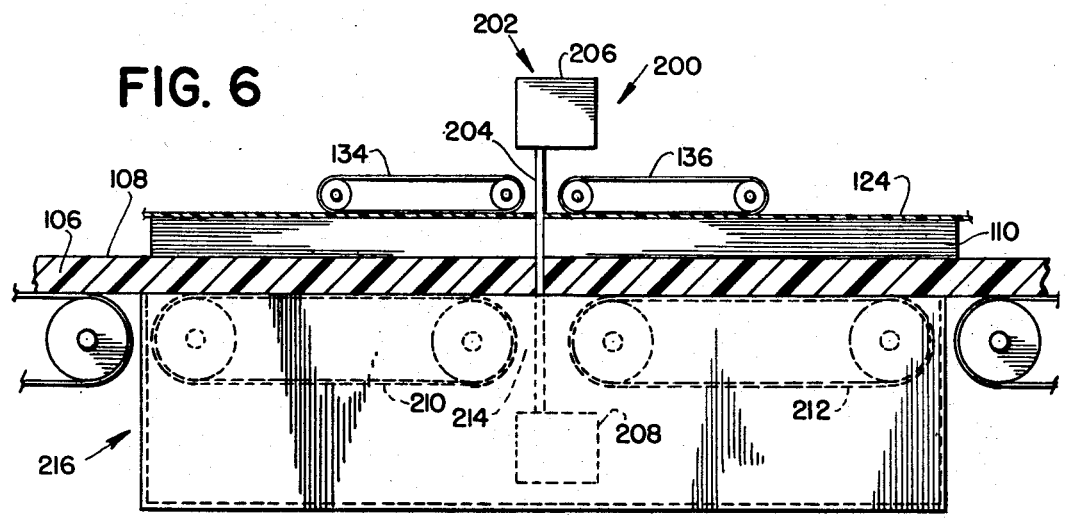
FIG. 6 is a schematic side view of apparatus comprising still another embodiment of this invention.

FIG. 6 shows a cutting apparatus indicated generally at 200 having a cutter, indicated generally at 202, utilizing a cutting blade 204 which passes entirely through the bed 106 of penetratable materials used to support the fabric layup 110. The cutter 202 has one main portion 206 located above the bed 106 of supporting material and another main portion 208 located below the bed 106. The cutter 202, may for example, be a bandsaw cutter with the blade 204 having adjacent up-traveling and down-traveling runs and with the portions 206 and 208 being the pulleys, guide rolls, motors and the like required for supporting and driving the blade. The cutter 202 may also be a jigsaw type cutter with the blade 204 being reciprocated vertically along its longitudinal axis. In the vicinity of the blade 204 the bed 106 is supported by two small belt conveyors 210 and 212 which are spaced from one another longitudinally of the bed 106 to form a gap 214 therebetween through which the blade 204 passes. A vacuum chamber defining means, indicated generally at 216, is located below the bed 106 in the vicinity of the cutter 202 and encloses both the lower portion 208 of the cutter and the two conveyors 210 and 212. The vacuum chamber defined by the means 216 is connected to a suitable source of vacuum and applies a vacuum to the under surface of the bed material 106 which vacuum passes therethrough and acts on the panel 124 to pull said panel toward the supporting surface 108 to compress the layup 110. The belts of the conveyors 210 and 212 are porous so that air may flow therethrough.

Figure 7:
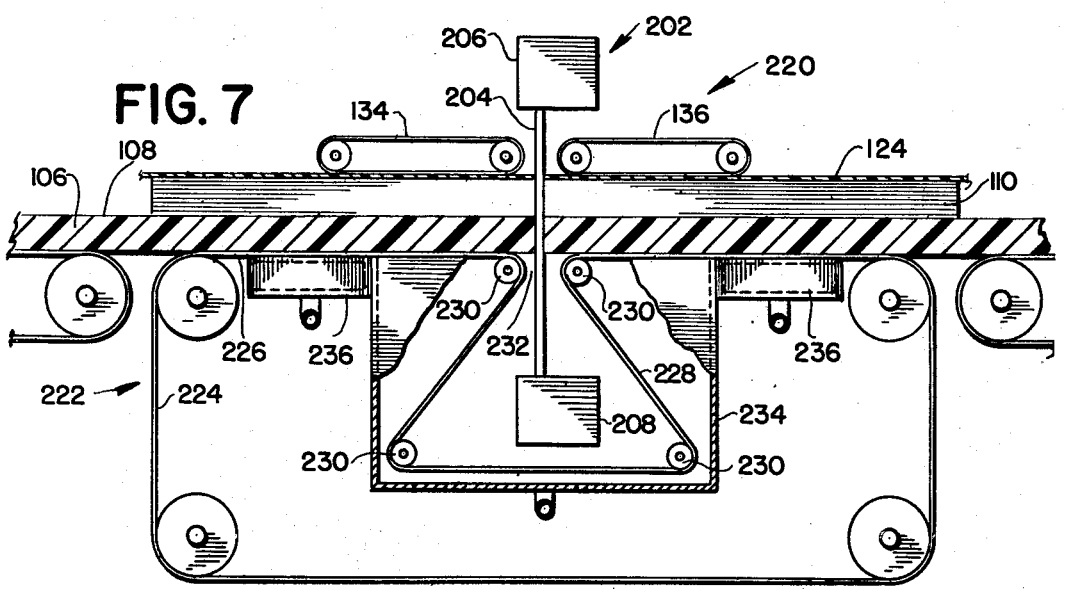
FIG. 7 is a schematic side view showing apparatus comprising yet another embodiment of this invention.

FIG. 7 shows an apparatus, indicated generally at 220, which is generally similar to that of FIG. 6, except that in the vicinity of the cutter 202 the bed of supporting material 106 is supported by a belt conveyor, indicated generally at 222, having a belt 224 with an upper run 226 which supports the bed 106. Along the upper run 226 the belt 224 is trained into a downwardly extending loop 228, by a number of rollers 230, 230, which loop surrounds the lower portion 208 of the cutter. The two upper rollers 230, 230 are located close to the blade 204 so as to form a small gap 232 therebetween through which the blade 204 passes. The belt 226 is porous and the entire loop 228 and the lower portion 208 of the cutter is surrounded by a vacuum chamber defining means or housing 234 which applies vacuum to the lower surface of the bed 106 in the vicinity of the cutter 202. If desired two additional vacuum chambers 236, 236 may be located on opposite sides of the main chamber 230 to apply vacuum to a greater extent of the supporting bed 106.

Figure 8:
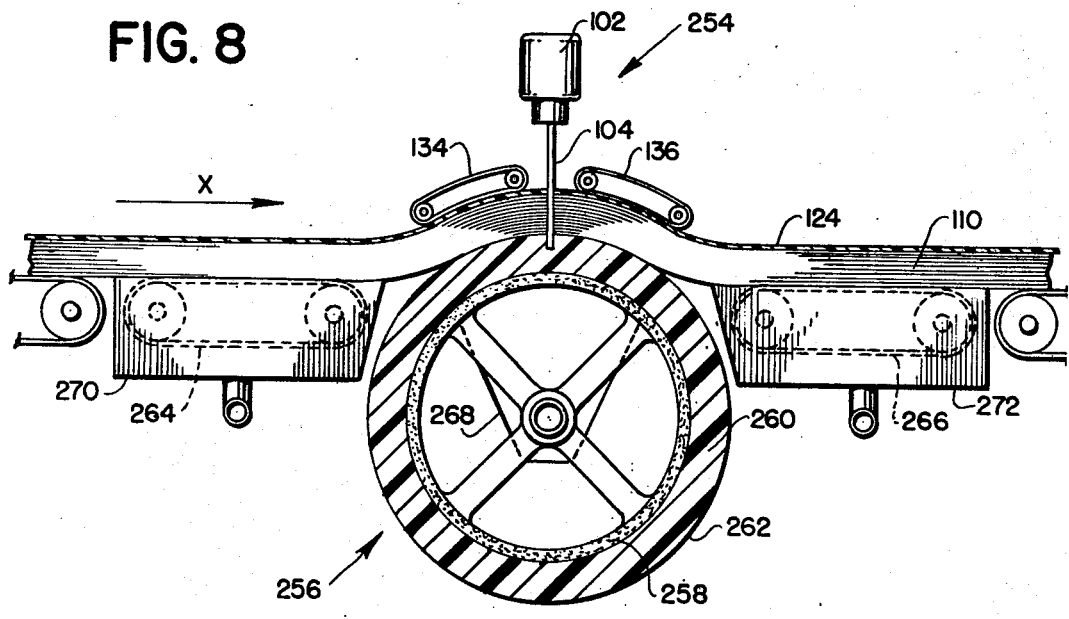
FIG. 8 is a schematic side view of apparatus comprising still another embodiment of this invention.

FIG. 8 shows a cutting device, indicated generally at 254, utilizing a rotary drum, indicated generally at 256, having a porous cylindrical wall 258. A bed of supporting material 260 is received on and surrounds the exterior surface of the drum wall 258, the material 260 preferably being plastic foam and having air conducting passages extending therethrough from its radially inner surface to its radially outer surface 262. The drum 256 is so arranged that a portion of the layup 110 travels thereover and as the drum is rotated the layup and its associated air-impervious overlay sheet 124 is moved in the X direction as indicated by the arrow in FIG. 8. The cutter 102 is movable in the Y direction. To assist in supporting and moving the layup in the X direction, the apparatus further includes two small belt conveyors 264 and 266 located on opposite sides of the drum. In the vicinity of the drum 256 vacuum is applied to the bottom surfaces of the layup 110 by a vacuum chamber defining means or housing 268 located within the drum and having an upwardly facing opening which exposes that portion of the cylindrical wall 258 registered therewith to the vacuum therein. Additional vacuum chambers 270 and 272 may be used on either side of the drum 256 for producing a vacuum over a great extent of the layup 110. The chambers 270 and 272 preferably enclose respectively the conveyors 264 and 266, as shown.

Figure 9:
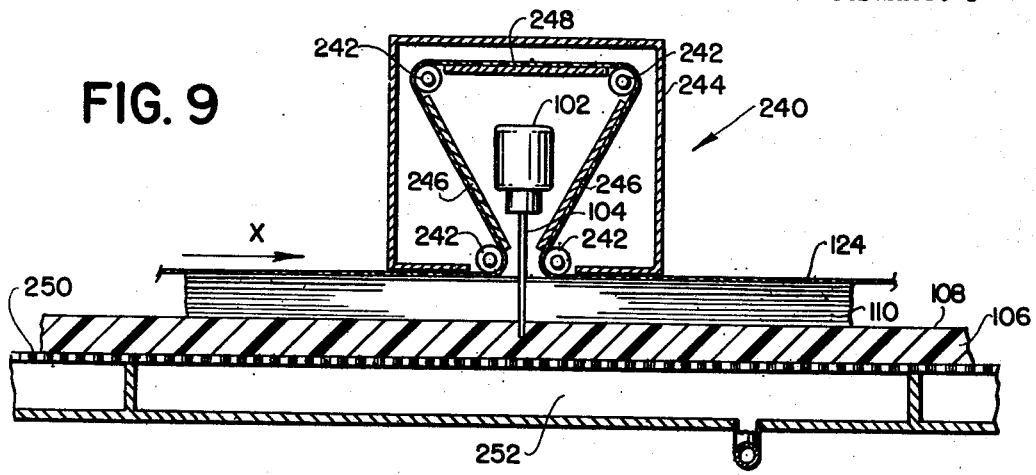
FIG. 9 is a schematic side view of apparatus comprising still another embodiment of this invention.

FIG. 9 shows a cutting apparatus 240 in which the air-impervious sheet 124 which is used to overlie the layup 110 is trained in a traveling loop over the cutter 102 so as to permit the sheet 124 to overlie the entire exposed surface of the layup while nevertheless avoiding the necessity for cutting such sheet with the cutting tool. As shown in this figure, the air-impervious sheet 124 is trained over the cutter 102 and into a loop by four rollers 242, 242, supported by an associated housing 244. Between the rollers the sheet is backed up by plates 246, 246 and 248 to resist the tendency of the loop to collapse toward the cutter by the vacuum existing within the loop. The housing 244, rollers and backing plates travel with the cutter 292 in the X direction as indicated by the arrow, and the cutter 102 moves in the Y direction. In FIG. 9, the bed of supporting material 106 is shown supported on a perforated wall 250 below which is one or more vacuum chambers such as shown at 252, for applying vacuum to the bed material.

We claim:

1. An apparatus for working on sheet material comprising means defining a generally horizontally disposed upwardly facing sheet material supporting surface having a plurality of openings distributed thereover and including a longitudinal series of contiguous supporting zones, at least one of said openings being associated with each of said zones, a tool, means supporting said tool for movement relative to said surface, means providing a vacuum source, and means responsive to the position of said tool relative to said surface for controllably connecting and disconnecting said vacuum source to and from said openings, so that as said tool moves longitudinally of said supporting surface said openings are connected to said vacuum source in zone-wise succession with the zones involved being said contiguous supporting zones.

2. An apparatus for working on sheet material as set forth in claim 1 further characterized by a substantially air-impervious panel for overlying at least an associated portion of the upper surface of sheet material received on said supporting surface.

3. An apparatus for working on sheet material as set forth in claim 2 further characterized by means for moving said panel longitudinally of and in contact with an exposed portion of the upper surface of sheet material received on said supporting surface in response to movement of said tool.

4. An apparatus for working on sheet material as set forth in claim 2 further characterized by said panel comprising an endless belt of substantially air-impervious material.

5. An apparatus for working on sheet material as set forth in claim 2 further characterized by said panel comprising a first endless belt of substantially air-impervious material supported for movement with said tool and positioned in front of said tool, and a second endless belt of substantially air-impervious material supported for movement with said tool and positioned to the rear of said tool.

6. An apparatus for working on sheet material as set forth in claim 1 further characterized by said tool comprising a cutting implement.

7. An apparatus for working on sheet material as set forth in claim 6 further characterized by said surface defining means comprising a bed of penetrable material having a plurality of passageways therethrough, each of said passageways communicating with an associated one of said openings and with said vacuum source, and said cutting implement having a cutting element which penetrates said bed of material during normal operation of said cutting implement to cut sheet material received on said supporting surface.

8. An apparatus for working on sheet material as set fourth in claim 7 further characterized by said bed of material comprising a bed of foamed plastic material.

9. An apparatus for working on sheet metal as set forth in claim 1 further characterized by said tool comprising a spreader for spreading sheet material onto said supporting surface.

10. An apparatus for working on sheet material as set forth in claim 1 further characterized by said means responsive to the position of said tool comprising at least one valve associated with each of said zones and movable between open and closed positions, said valve in said open position providing communication between said vacuum source and said one opening and in said closed position blocking communication between said vacuum source and said one opening, means biasing said valve to said closed position, and means associated with said supporting means for moving said valve to said open position.

11. An apparatus for working on sheet material as defined in claim 1 further characterized by a control means for maintaining the vacuum applied to said openings at a substantially constant preselected level despite changes in the flow rate of air through said openings.

12. An apparatus for working on sheet material comprising a bed of supporting material defining a surface for supporting sheet material spread thereover and having air-flow passages passing therethrough communicating with said supporting surface, a piece of substantially air-impervious sheet material overlying at least an associated portion of the exposed surface of the material spread over said supporting surface, a vacuum chamber located on the opposite side of said bed of supporting material from said supporting surface and communicating with said air-flow passages for producing a vacuum adjacent said supporting surface which acts on said sheet of air-impervious material and pulls it toward said supporting surface so as to compress said sheet material between it and said supporting surface, a tool for working on sheet material spread on said supporting surface, a means for moving said tool and said bed of supporting material relative to one another.

13. An apparatus for working on sheet material as defined in claim 12 further characterized by means for holding said bed stationary, and said means for moving said tool and said supporting surface relative to one another comprising means supporting said tool for movement relative to said bed in a plane generally parallel to said supporting surface.

14. An apparatus for working on sheet material as defined in claim 12 further characterized by said means for moving said tool and said bed of supporting material relative to one another comprising a belt conveyor having a belt supporting said bed of material, said vacuum chamber being located on the side of the said belt opposite from said bed of material and said belt being porous so that air may flow therethrough from said bed of supporting material to said vacuum chamber.

15. An apparatus for working on sheet material as defined in claim 12 further characterized by said means for moving said tool and said bed of supporting material relative to one another including a belt conveyor having a belt with an upwardly facing upper run on which said bed of supporting material is supported, means associated with said upper run of said belt for training said belt along said upper run into a downwardly extending loop, said vacuum chamber being located adjacent said upper run of said belt on the opposite side thereof from said bed of supporting material, said belt being porous so that air may flow therethrough from said bed of supporting material to said vacuum chamber, and said tool being a cutting tool having a cutting blade which passes through the sheet material spread on said supposting surface and through said bed of supporting material, said cutter further including a portion thereof located below said bed of supporting material and within said loop of said upper run of said belt conveyor.

16. An apparatus for working on sheet material as defined in claim 12 further characterized by a rotatable drum having a porous cylindrical wall, said bed of supporting material being received on and surrounding the outer surface of said cylindrical wall of said drum, said vacuum chamber being located on the inside of said drum and exposing at least a portion of the interior surface of said cylindrical wall to the vacuum therein, said tool being located adjacent said drum for working on fabric supported thereby.

17. An apparatus for working on sheet material as defined in claim 12 further characterized by said piece of substantially air-impervious sheet material overlying substantially the entire extent of the exposed surface of the material spread over said supporting surface, and means in the vicinity of said tool for forming said piece of sheet material into a traveling loop which contains that portion of said tool which is located outwardly beyond said exposed surface of material spread over said supporting surface.

18. An apparatus for working on sheet material as defined in claim 12 further characterized by said tool being a cutter for cutting sheet material spread on said supporting surface and which cutter includes a cutting tool passing completely through said bed of supporting material.

19. An apparatus for working on sheet material as defined in claim 18 further characterized by said cutter having a portion thereof located on the opposite side of said bed from said sheet material.

20. An apparatus for working on sheet material as defined in claim 19 further characterized by said portion of said cutter being located within said vacuum chamber.

21. An apparatus for working on sheet material as defined in claim 19 further characterized by said means for moving said tool and said bed of supporting material relative to one another including a belt conveyor having a belt with an upper run on which said bed of supporting material is supported.

22. An apparatus for working on sheet material as defined in claim 19 further characterized by said means for moving said tool and said bed of supporting material relative to one another including two belt conveyors located on the opposite side of said bed of supporting material from said supporting surface, said two conveyors being located on opposite sides of said cutting tool so as to form a gap therebetween through which said cutting tool passes.

23. An apparatus for working on sheet material comprising a bed of penetrable material defining a surface for supporting sheet material spread thereover, a piece of substantially air-impervious sheet material overlying at least an associated portion of the exposed surface of the material spread over said supporting surface, means for producing a vacuum adjacent said supporting surface which acts on said sheet of air-impervious material and pulls it toward said supporting surface so as to compress said sheet material between it and said supporting surface, a cutter for cutting sheet material spread on said supporting surface, and means for moving said cutter and said supporting surface relative to one another along a given line of cut, said cutter having a cutting tool which during normal operation of said cutter to cut sheet material received on said supporting surface penetrates said bed of penetrable material.

24. An apparatus for working on sheet material comprising means defining a surface for supporting sheet material spread thereover, a tool for working on sheet material spread on said supporting surface, means for moving said tool relative to said supporting surface, a piece of substantially air-impervious sheet material overlying at least an associated portion of the exposed surface of the material spread over said supporting surface, said piece of substantially air-impervious sheet material comprising at least one endless belt of air-impervious material, means for moving said endless belt in response to the movement of said tool relative to said supporting surface, and means for producing a vacuum adjacent said supporting surface which acts on said sheet of air-impervious material and pulls it toward said supporting surface so as to compress such sheet material between it and said supporting surface.

References Cited
UNITED STATES PATENTS

| | | | |
|---|---|---|---|
| 1,172,058 | 2/1916 | Scheyer | 83—561 X |
| 3,245,295 | 4/1966 | Mueller. | |
| 3,262,348 | 7/1966 | Wiatt et al. | |
| 3,304,820 | 2/1967 | Mueller et al. | 83—424 X |
| 3,347,121 | 10/1967 | Wiatt | 83—428 X |
| 3,350,969 | 11/1967 | Wiatt et al. | 83—428 X |

JAMES M. MEISTER, Primary Examiner

U.S. Cl. X.R.

83—422, 424, 427, 428, 451, 561

PO-1050 (5/69)

UNITED STATES PATENT OFFICE
CERTIFICATE OF CORRECTION

Patent No. 3,495,492      Dated February 17, 1970

Inventor(s) HEINZ JOSEPH GERBER and DAVID R. PEARL

It is certified that error appears in the above-identified patent and that said Letters Patent are hereby corrected as shown below:

Col. 3, line 3 - "logs" should be --legs--

Col. 3, line 42 - "42, 52" should be --42, 42--

SIGNED AND SEALED
JUL 7 1970

(SEAL)
Attest:

Edward M. Fletcher, Jr.
Attesting Officer

WILLIAM E. SCHUYLER, JR.
Commissioner of Patents